United States Patent
Schimitschek et al.

[15] 3,699,211
[45] Oct. 17, 1972

[54] METHOD OF PREPARATION OF RARE EARTH (III) PHOSPHORUS DICHLORIDATES AND PHOSPHORUS DIBROMIDATES

[72] Inventors: Erhard J. Schimitschek, Garching/Munich, Germany; John A. Trias, La Mesa, Calif.

[73] Assignee: The United States of America as represented by the Secretary of the Navy

[22] Filed: Jan. 29, 1971

[21] Appl. No.: 110,920

[52] U.S. Cl. ................423/263, 423/300, 260/544, 260/664
[51] Int. Cl. .............................................C22b 59/00
[58] Field of Search....................23/20, 22, 105, 368

[56] References Cited

OTHER PUBLICATIONS

Kauffmann et al., " Zeitschrift fur Anorganische und Allgemeine Chemie" Vol. 347, 1966, pp. 318– 326.
Muller et al., " Zeitschrift fur Anorganische und Allgemeine Chemie," Vol. 350, 1967, pp. 231– 236.

*Primary Examiner*—Herbert T. Carter
*Attorney*—R. S. Sciascia, G. J. Rubens and J. W. McLaren

[57] ABSTRACT

A novel and desirable method of preparing a rare earth (III) phosphorus dichloridate comprises the steps of adding a rare earth trifluoroacetate to phosphorus oxychloride, refluxing the mixture and then washing the resultant precipitate under a dry atmosphere to remove excess moisture and phosphorus oxychloride. The method may also be employed in preparation of a rare earth (III) phosphorus dibromidate by the analagous steps of adding a rare earth trifluoroacetate to phosphorus oxybromide, refluxing the mixture, and finally washing the resultant precipitate under dry atmosphere to remove the excess moisture and phosphorus oxybromide. Any of the rare earths may be employed in their trifluoroacetate form except those which are radio active, and, though not limited to the preparation of neodymium (III) phosphorus dichloridate, the method is particularly desirable in that instance because of the fact that neodymium (III) phosphorus dichloridate is highly desirable in liquid laser compositions.

9 Claims, 1 Drawing Figure

3,699,211
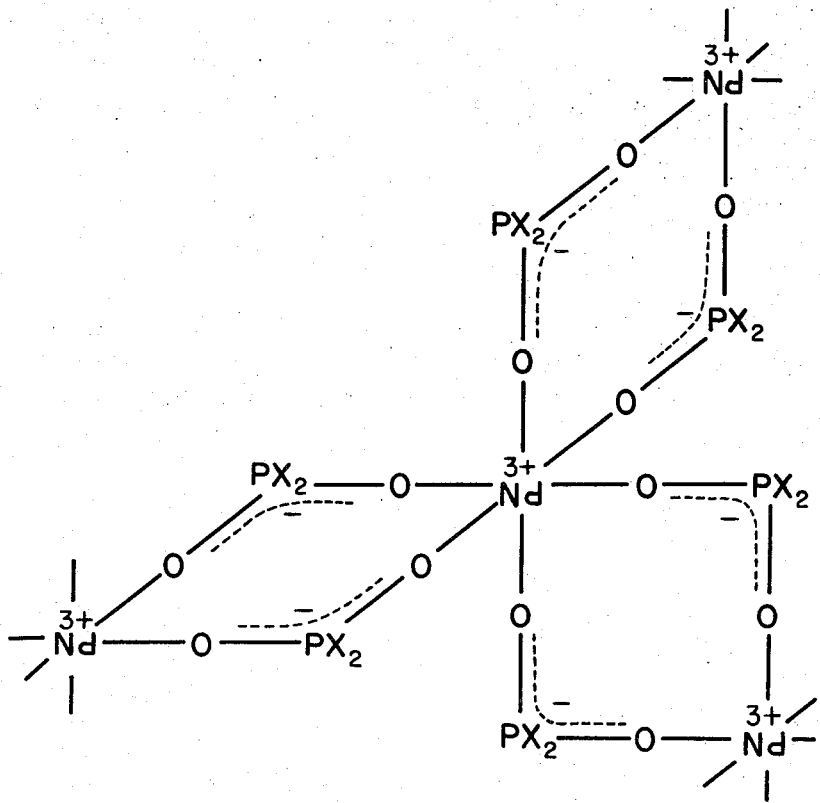
INVENTORS
ERHARD J. SCHIMITSCHEK
JOHN A. TRIAS
BY
ATTORNEYS

METHOD OF PREPARATION OF RARE EARTH (III) PHOSPHORUS DICHLORIDATES AND PHOSPHORUS DIBROMIDATES

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Although many of the organic derivatives of phosphorus-dichloridic and phosphorous-dibromidic acid are known, relatively few inorganic salts have been prepared. In recent scientific publications the prior art has described the preparation and properties of thorium, aluminum, gallium, indium, iron and beryllium phosphorous dichloridates. The prior art method of preparation of such compositions has consisted of dissolving the respective anhydrous metal chloride in phosphorus oxychloride and then introducing chlorine mono-oxide; that reaction might be represented as:

$$MCl_3 + 3POCl_3 + 3Cl_2O \rightarrow M(O_2PCl_2)_3 + 6Cl_2 \qquad (1)$$

This method as employed with neodymium trichloride, required dissolution in phosphorus oxychloride which would, upon the introduction of chlorine mono-oxide, produce a neodymium (III) phosphorus dichloridate and also chlorine gas. While this method of preparation produced the desired compound, it was also undesirable and cumbersome in the aspects of handling and dealing with the gases chlorine mono-oxide and chlorine, particularly in view of their highly corrosive and noxious nature.

The production of neodymium (III) phosphorus dichloridate is of particular interest because of its use in a liquid laser composition as disclosed by E. J. Schimitschek and J. A. Trias of the Naval Electronics Laboratory Center, San Diego, California, in a paper presented at the Sixth International Quantum Electronics Conference in September 1970 held in Kyoto, Japan. Accordingly, an improved method and technique for the production of that particular rare earth phosphorus dichloridate is highly desirable.

SUMMARY OF THE INVENTION

The concept of the present invention comprises a method of preparing a rare earth (III) phosphorus dichloridate or a rare earth (III) phosphorus dibromidate. In the method for preparing a rare earth (III) phosphorus dichloridate the steps include adding a rare earth trifluoroacetate to phosphorus oxychloride, refluxing the mixture thoroughly, and washing the resultant percipitate under dry atmosphere, for example, to thoroughly remove excess moisture and phosphorus oxychloride. This is required because of the highly hygroscopic nature of the resultant rare earth (III) phosphorus dichloridate precipitate.

The concept of the present invention also includes preparation of a rare earth (III) phosphorus dibromidate by performing the steps of adding a rare earth trifluoroacetate to phosphorus oxybromide, refluxing the mixture, and then washing the resultant percipitate under a dry atmosphere to thoroughly remove excess moisture, as well as excess phosphorus oxybromide.

It will be obvious to those skilled in the art that a compound highly desirable for use in a liquid lasing composition, namely neodymium (III) phosphorus dichloridate, may be produced by the novel method conceived by the present invention without the use of chlorine mono-oxide and without producing chlorine gas by the reaction. Moreover, the present invention conceives the production of numerous rare earth (III) phosphorus dichloridates and rare earth (III) phosphorus dibromidates including those wherein the rare earth may be lanthanum, cerium, praseodymium, samarium, europium, gadolinium, terbium, dysprosium, holmium, erbium, thulium, ytterbium, and lutetium, as well as neodymium.

Accordingly, it is a primary object of the present invention to provide an improved method of preparing rare earth (III) phosphorus dichloridates and rare earth (III) phosphorus dibromidates.

Another most important object of the present invention is to provide such a method which eliminates the need for a gas such as chlorine mono-oxide to promote the reaction producing the desired resultant compound.

Still another most important object of the present invention is to provide an improved method of preparation as described above wherein the concomitant reaction does not produce a gas such as the noxious and corrosive chlorine produced in prior art methods of preparation of comparable compounds.

A further object of the present invention is to devise a method of preparing rare earth (III) phosphorus compounds in both dichloridic and dibromidic forms.

These and other objects, features and advantages of the present invention will be better appreciated from an understanding of the disclosure of the novel method of preparation described hereinafter.

DESCRIPTION OF THE DRAWING

The drawing illustrates a proposed structure for $Nd(O_2PX_2c_3$ where "X" may be either chlorine or bromine.

DESCRIPTION OF THE PREFERRED METHOD

In the prior art method of the preparation of metallic phosphorus dichloridates, such as exemplified by the chemical reaction represented in the foregoing Equation (1), the respective anhydrous metal chloride was dissolved in phosphorus oxychloride and thereafter chlorine monooxide was introduced into the solution. If it is desired, however, to prepare neodymium (III) phosphorus dichloridate it will be found that anhydrous neodymium trichloride is not soluble in phosphorus oxychloride; however, neodymium trifluoroacetate does dissolve in phosphorus oxychloride and therefore a reaction may be brought about immediately without the introduction of chlorine mono-oxide. This reaction may be represented as follows:

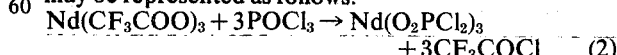

During the reaction represented above, trifluoroacetyl chloride, which has a boiling point of $-18°$ C., escapes and may be positively identified by comparing its vapor phase infrared spectrum with a commercial sample of trifluoroacetyl chloride, for example. The solid product which is not soluble in the phosphorus oxychloride may be easily separated from the excess phosphorus oxychloride and then dried.

The same method as described hereinbefore may be applied to the preparation of neodymium (III) phosphorus dibromidate by substituting phosphorus oxybromide for the phosphorus oxychloride in the procedure. Both materials are very hygroscopic and react with water and alcohols. However, they do not dissolve in the none-or low-polar solvents, but do dissolve in highly polar solvents like dimethyl sulfoxide or dimethyl formamide. The neodymium (III) phosphorus dichloridate is a light blue powder, whereas neodymium (III) dibromidate is a reddish-grey powder. No melting point was observed for either compound up to 350° C.

The infrared absorption spectra of these two compounds indicate at least partial covalency of the Nd—O bond and furthermore, an approximate $D_3$ symmetry at the Nd site. This, in addition to the chemical behavior, i.e., high thermal stability, and low solubility may be interpreted to be evidence of polymerization. X-ray measurements on related compounds, such as $M_n(PO_2Cl_2)_2 \cdot (CH_{3b}{}^{COOC}{}_2H_5)_3$ and $Ca(PO_2F_2)_2 \cdot (CH_3COOC_2H_5)_2$ revealed that the $O_2PX_2$-groups ($X = F, Cl, Br,$) easily bridge neighboring metal ions, forming eight membered rings. It is therefore suggested that $Nd(O_2PCl_2)_3$ and $Nd(O_2PBr_2)_3$ may comprise a similar proposed structure such as illustrated in FIG. 1 which would also account for an approximate $D_3$ symmetry.

Although as mentioned hereinbefore, $Nd(O_2PCl_2)_3$ does not dissolve in $POCl_3$, it does go into solution after adding a tetra-valent metal chloride, like $ZrCl_4$, in a ratio of 1:1 or higher. The $ZrCl_4$ apparently opens the $O_2PCl_2$-bridges by coordination to the oxygens so that at least partial solvation of the neodymium with the $POCl_3$ can occur. One of the primary interests in these solutions, typically 0.2M $Nd(O_2PCl_2)_3$ and 0.4M $ZrCl_4$, is stimulated by their application in liquid lasers such as the improved liquid lasing composition disclosed in copending patent application Ser. No. 111,128, titled A Liquid Laser Solution Formed with a Neodymium Salt in Phosphorus Oxychloride, and filed Jan. 29, 1971 in the names of applicants herein.

PREPARATION PROCEDURE

For the preparation of $Nd(O_2PCl_2)_3$, 0.5 gr of anhydrous $Nd(CF_3COO)_3$ and 3 ml of $POCl_3$ (distilled) were added to 20 ml of $CCl_4$ an inert, non-reactive solvent employed to facilitate the reaction. The mixture was gently refluxed for 1 hour, and the resulting precipitate was carefully washed under dry atmosphere to remove excess moisture and $POCl_3$. The $CCl_4$ and some solvated $POCl_3$ were removed by drying under vacuum at 100° C. for approximately 10 hours. The product, obtained in essentially 100 percent yield, was a free flowing powder. The same procedure was followed to prepare $Nd(O_2PBr_2)_3$, but the 3 ml $POCl_3$ was replaced by 5 gr of $POBr_3$.

The $Nd(CF_3COO)_3$ was prepared by dissolving $Nd_2O_3$ in diluted $CF_3COOH$, driving most of the water out through heating, and finally drying the product at 60° C. under vacuum for 5 days.

As may be readily appreciated by those skilled and knowledgeable in the art, the method of the present invention provides a direct reactionary process for the preparation of rare earth (III) phosphorus dichloridates and rare earth (III) phosphorus dibromidates which eliminates the need to introduce chlorine mono-oxide into a mixture as was done in prior art practices, and, as is equally important, also eliminates the production of chlorine gas as a result of the reaction.

As will be equally well appreciated by those knowledgeable and skilled in the art, the preparation of rare earth (III) phosphorus dichloridates and rare earth (III) phosphorus dibromidates by the improved method of the present invention is of particular current interest because of the highly desirable results obtained with several of these compounds when they are employed in liquid lasing compositions, though the concept and teachings of the present invention in no way limit the usages of the resultant compounds.

Obviously many modifications and variations of the present invention are possible in the light of the above teachings. It is therefore to be understood that within the scope of the appended claims the invention may be practiced otherwise than as specifically described.

What is claimed is:

1. A method of preparing a rare earth (III) phosphorus dichloridate comprising the steps of:
   reacting a rare earth trifluoroacetate with phosphorus oxychloride;
   refluxing the mixture; and,
   washing the resultant precipitate under dry atmosphere to remove the excess phosphorus oxychloride.

2. A method of preparing a rare earth (III) phosphorus dichloridate as claimed in claim 1 wherein neodymium trifluoroacetate is reacted with phosphorus oxychloridate.

3. A method of preparing a rare earth (III) phosphorus dichloridate as claimed in claim 1 wherein the rare earth trifluoroacetate reacted with phosphorus oxychloride is that of one of the rare earths: lanthanum, cerium, praseodymium, samarium, europium, gadolinium, terbium, dysprosium, holmium, erbium, thulium, ytterbium, and lutetium.

4. A method of preparing a rare earth (III) phosphorus dibromidate comprising the steps of:
   reacting a rare earth trifluoroacetate with phosphorus oxybromide;
   refluxing the mixture; and,
   washing the resultant precipitate under dry atmosphere to remove the excess phosphorus oxybromide.

5. A method of preparing a rare earth (III) phosphorus dibromidate as claimed in claim 4 wherein the rare earth trifluoroacetate reacted with phosphorus oxybromide is that of one of the rare earths: lanthanum, cerium, praseodymium, neodymium, samarium, europium, gadolinium, terbium, dysprosium, holmium, erbium, thulium, ytterbeium, and lutetium.

6. A method of preparing a rare earth III phosphorus dichloridate as claimed in claim 1 wherein the rare earth trifluoroacetate reacts with phosphorus oxychloride in an inert, non-reactive solvent.

7. A method of preparing a rare earth III phosphorus dichloridate as claimed in claim 6 wherein said solvent is carbon tetrachloride.

8. A method of preparing a rare earth III phosphorus dibromidate as claimed in claim 4 wherein the rare earth trifluoroacetate reacts with phosphorus oxybromide in an inert non-reactive solvent.

9. A method of preparing a rare earth III phosphorus dibromidate as claimed in claim 8 wherein said solvent is carbon tetrachloride.

* * * * *